United States Patent

[11] 3,580,600

| [72] | Inventor | Harry B. Caplin<br>60 Copperfield Road, Worcester, Mass. 01602 |
|---|---|---|
| [21] | Appl. No. | 822,588 |
| [22] | Filed | May 7, 1969 |
| [45] | Patented | May 25, 1971 |

[54] COLLAPSIBLE HANDTRUCK
3 Claims, 3 Drawing Figs.

[52] U.S. Cl. ............................................................ 280/36,
280/47.27, 280/47.29
[51] Int. Cl. ....................................................... B62b 1/04
[50] Field of Search ............................................. 280/47.27,
47.29, 36, (WSB)(Digest)

[56] References Cited
UNITED STATES PATENTS
1,554,034  9/1925  Richie .......................... 280/(WSB)
2,500,589  3/1950  Wuerthner ................... 280/47.27X
FOREIGN PATENTS
956,119  1/1950  France ........................ 280/36

Primary Examiner—Kenneth H. Betts
Assistant Examiner—John A. Pekar
Attorney—Charles Hieken ABSTRACT: A collapsible handtruck comprises an upwardly extending baseplate to which a lower baseplate is hinged to form a support of generally L-shaped cross section. A pair of wheels are attached to the upwardly extending baseplate. A pantographic member, of the lazy tongs type, has its lower point attached to the center of the upper edge of the upwardly extending baseplate and a handle attached to the upper point. The resulting structure may then be collapsed into a compact bundle for easy storage in the trunk of an automobile.

PATENTED MAY 25 1971　　　　　　　　　　　　　　　　3,580,600

INVENTOR.
HARRY B. CAPLIN
BY
Wolf, Greenfield, Hieken & Sacks
ATTORNEYS

COLLAPSIBLE HANDTRUCK

BACKGROUND OF THE INVENTION

The present invention relates in general to collapsible handtrucks and more particularly concerns a novel compact collapsible handtruck that is relatively easy and inexpensive to manufacture, light in weight, easy to expand and collapse, and yet capable of carrying relatively heavy loads while rapidly assuming a very compact volume when not in use and collapsed.

It is an important object of the invention to provide a collapsible handcart that is relatively inexpensive to manufacture, relatively lightweight, easy to collapse and expand, easy to use, and capable of assisting in the carrying of relatively large weights.

SUMMARY OF THE INVENTION

According to the invention, there is rollably supported roller support means, handle means, and pantographic means collapsibly securing the handle means to the lower support means.

Numerous other features, objects and advantages of the invention will become apparent from the following specification when read in connection with the accompanying drawing in which:

DETAILED DESCRIPTION OF PREFERRED EMBODIMENTS

Figure 1:
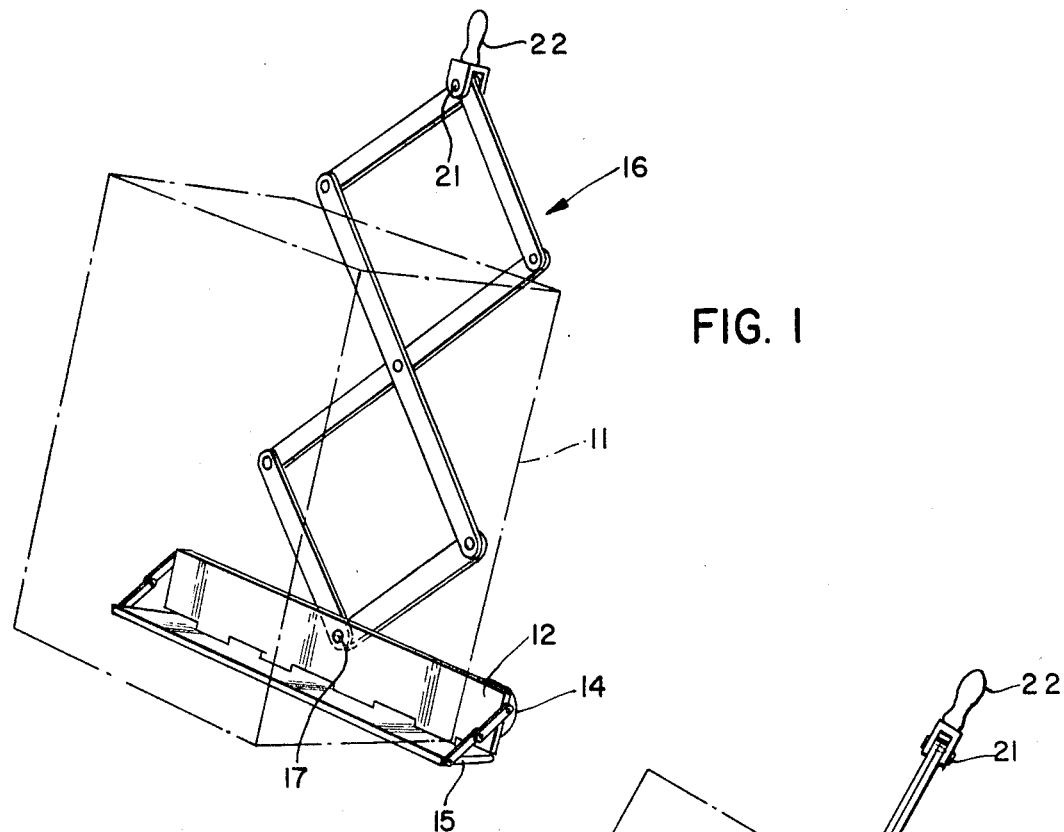
FIGS. 1 and 2 are front and side views respectively of the invention in use in the expanded position.
Figure 2:
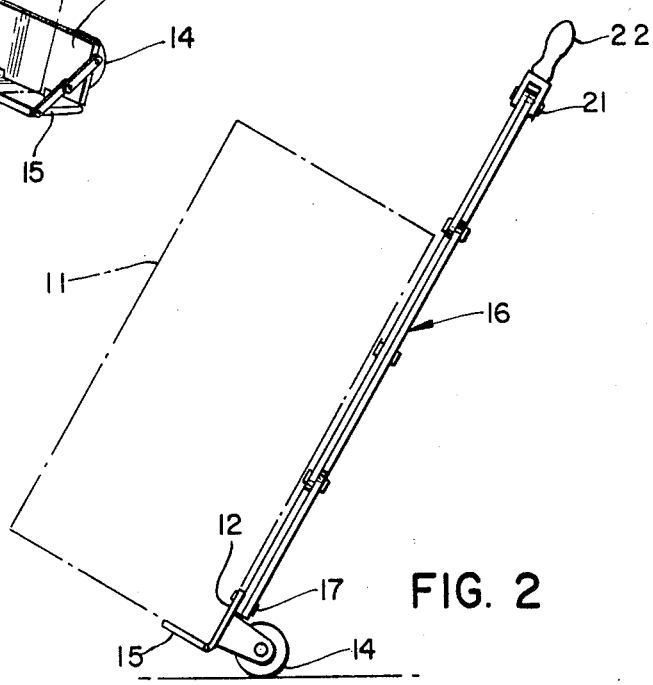

With reference now to the drawing and more particularly FIGS. 1 and 2 thereof, the invention is shown carrying a large box 11 indicated in dotted outline so as not to obscure structural details of the invention. The collapsible handtruck comprises an upwardly extending baseplate 12 to which a pair of wheels 13 and 14 are attached. A lower baseplate 15 is hingeably attached to upper baseplate 12 and movable from a collapsed position parallel and adjacent to upper plate 12 to an expanded position generally perpendicular to the latter. The elements 12—15 thus comprise lower support means rollably supported.

A pantographic member 16 of the lazy tongs type has its lower point 17 connected to the midpoint of upwardly extending base 12 near the top and its upper apex 21 pivotally connected to the bottom of handle 22 and thus comprises means for collapsibly intercoupling handle means 22 to upwardly extending base 12. The pantographic member 16 comprises the back of the collapsible cart and as can be seen the space between adjacent pivot points on a link of the pantographic member is greater than the height of the lower support means.

Figure 3:
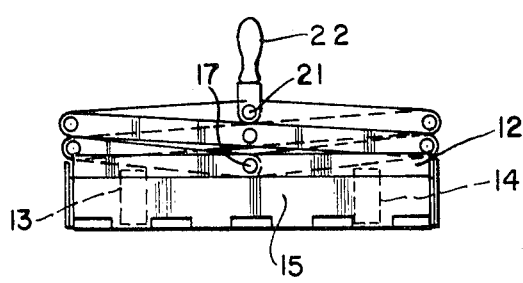
FIG. 3 is a front view of the invention collapsed for compact storage.

Referring to FIG. 3, there is shown a front view of the invention in the collapsed position. Note how compact the cart is when in the collapsed position. And when made of lightweight material, such as aluminum, the cart itself is convenient to handle, even by a woman.

There has been described a novel collapsible handcart that is relatively easy and inexpensive to manufacture, easy to expand and collapse, lightweight and convenient to handle and yet capable of supporting relatively heavy loads. It is evident that those skilled in the art may now make numerous modifications and uses of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

I claim:

1. A collapsible handcart comprising,
    rollably supported lower support means,
    handle means,
    and pantographic back means for collapsibly intercoupling said handle means and said rollably supported lower support means and for helping to support loads when in the expanded position with the lowermost point of said pantographic means connected substantially to the midpoint near the top of said lower support means with said pantographic means continuously adjustable between a fully collapsed position for storage and an extended position for use with the span between adjacent pivot points on a link of said pantographic means being greater than the height of said lower support means, said handle connected to the upper apex of the pantographic means.

2. A collapsible handcart in accordance with claim 1 wherein said rollably supported lower support means comprises,
    an upwardly extending lower baseplate,
    a pair of roller means attached to said upwardly extending baseplate,
    and a foldable baseplate hingeably attached to said upwardly extending baseplate movable to a position substantially at right angles to said upwardly extending baseplate for helping to support a load when said cart is in the expanded position and movable to a position generally parallel to said upwardly extending baseplate when said cart is in the collapsed position.

3. A collapsible handcart in accordance with claim 2 wherein the lowermost point of said pantographic means is connected to the upper middle of said upwardly extending baseplate and the uppermost point thereof is connected to a lower portion of said handle means.